(12) United States Patent
Kubogata

(10) Patent No.: US 6,252,844 B1
(45) Date of Patent: Jun. 26, 2001

(54) PHASE-CHANGE TYPE OPTICAL RECORDING MEDIUM AND METHOD OF OPTICALLY RECORDING WITH THE SAME

(75) Inventor: Masayuki Kubogata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 08/925,534

(22) Filed: Sep. 8, 1997

(30) Foreign Application Priority Data

Sep. 13, 1996 (JP) .................................... 8-242949
Sep. 26, 1996 (JP) .................................... 8-254620

(51) Int. Cl.$^7$ ........................................ G11B 7/00
(52) U.S. Cl. .............................. 369/275.2; 369/53.33
(58) Field of Search ................... 369/275.1, 275.2, 369/275.3, 275.4, 275.5, 124, 116, 13

(56) References Cited

U.S. PATENT DOCUMENTS

| | | | |
|---|---|---|---|
| 5,348,783 | * 9/1994 | Ohno et al. | 369/275.2 |
| 5,689,487 | * 11/1997 | Iwanaga | 369/124 |
| 5,719,006 | * 2/1998 | Ohkubo | 369/275.5 |
| 5,818,808 | * 10/1998 | Takada et al. | 369/275.5 |

FOREIGN PATENT DOCUMENTS

| | | |
|---|---|---|
| 60-145537 | 8/1985 | (JP) . |
| 63-183624 | 7/1988 | (JP) . |
| 63-49067 | 12/1994 | (JP) . |
| H9-73660 | 3/1997 | (JP) . |

* cited by examiner

*Primary Examiner*—Nabil Hindi
(74) *Attorney, Agent, or Firm*—Hayes, Soloway, Hennessey Grossman & Hage, PC

(57) ABSTRACT

There is provided a phase-change type optical recording medium, including: a substrate; a recording layer formed on the substrate, phase condition of the recording layer being changed when a laser beam is radiated thereonto, to thereby record, erase or reproduce data into or from the recording layer; and a reflection layer formed on the recording layer for reflecting a laser beam having been radiated onto the recording layer. The recording layer is formed so that the following equation is established:

$$Rc > Rm > Ra$$

wherein Rc indicates a reflectivity to be obtained when the recording layer is in crystal condition, Ra indicates a reflectivity to be obtained when the recording layer is in amorphous condition, and Rm indicates a reflectivity to be obtained when the recording layer is in mixed condition of molten condition and crystal or amorphous condition. For instance, the substrate, recording layer and reflection layer may be designed to have a thickness and/or made of particular material so that the equation is established. The phase-change type optical recording medium makes it possible to accurately accomplish verification by which it is confirmed whether data is properly recorded at both initial recording and over-recording.

21 Claims, 14 Drawing Sheets

Pw = 13.0 mW

Pw = 9.0 mW

Pw = 7.0 mW

Pw=13.0mW

Pw=10.0mW

Pw=8.0mW

Pw=13.0mW

Pw=10.0mW

Pw=9.0mW

Pw=8.0mW

Pw=6.0mW

Pw=5.0mW

Pw = 8.0 mW

Pw = 6.0 mW

Pw = 5.0 mW

Pw = 8.0 mW

Pw = 6.0 mW

Pw = 5.0 mW

PHASE-CHANGE TYPE OPTICAL RECORDING MEDIUM AND METHOD OF OPTICALLY RECORDING WITH THE SAME

BACKGROUND OF THE INVENTION

1. Field of the Invention

The invention relates to an optical recording medium capable of recording data thereinto or reproducing data therefrom, and more particularly to an optical recording medium suitable for carrying out so-called "simultaneous recording and verification" where confirmation as to whether data is properly recorded is carried out concurrently with recording data into a medium. The invention also relates to a method of optically recording data into an optical recording medium and reproducing data therefrom.

2. Description of the Related Art

As one of optical disc mediums capable of recording data thereinto and reproducing data therefrom both by radiating laser beam spot thereto is known a phase-change type optical disc. The phase-change type optical disc is capable of carrying out over-recording by a single beam, which is difficult to carry out by a magneto-optical (MO) disc. An optical head system for the phase-change optical disc is simpler than that for the MO disc.

A method of carrying out simultaneous recording and verification in such a phase-change type recording medium has been suggested in Japanese Unexamined Patent Publications Nos. 60-145537, 63-183624, and 6-349067. According to these Publications, when pulse beams are radiated onto the phase-change type recording medium, an intensity of reflected beams is varied almost at the same with the radiation. The suggested methods make it possible to confirm whether data is properly recorded by detecting the variation in the reflected beams by means of either the reflected beams itself or RF signals.

Roughly speaking, data is recorded into a phase-change type optical disc medium by the following steps: radiating laser beams onto a non-recorded region, which is in crystal condition, to thereby heat a recording layer; a temperature of the recording layer being raised; melting of the recording layer; and cooling down the recording layer to thereby reduce the recording layer amorphous. Hence, non-recorded and recorded regions have different phase conditions, and as a result, non-recorded and recorded regions have different reflectivity. Accordingly, an intensity of reflected laser beams is varied in accordance with the phase condition. A phase-change type optical disc medium utilizes such variation in an intensity of reflected laser beams for recording data thereinto.

It is known that a recording layer becomes as illustrated in FIG. 1, when a recording layer is molten by a laser beam spot. Thus, all regions of a recording layer are not always molten in a beam spot, even if a laser beam is radiated onto the recording layer. Herein, the molten region 60 corresponds to a region in which data is recorded, and the non-molten region 62 corresponds to a region in which data is not recorded yet. As mentioned earlier, the molten region 60 becomes amorphous when cooled down, whereas the non-molten region 62 remains crystal. If a recording layer is not molten, the recording layer is not reduced amorphous. In the beam spot, reflectivity of the recorded or amorphous region 60 coexists together with reflectivity of the non-recorded or crystal region 62, and hence it would be quite difficult to clearly distinguish the recorded region 60 from the non-recorded region 62. As a result, it would be difficult to accurately carry out simultaneous recording and verification only based on variation in the reflectivity. Hence, verification has to be carried out again after data has been recorded into a phase-change type optical disc medium in the above mentioned conventional mediums. As a result, it is substantially impossible to carry out simultaneous recording and verification in the conventional mediums.

In addition, in the conventional mediums where the recorded region has to have reflectivity quite different from that of the non-recorded region, there would be generated a large fluctuation in RF signals in over-recording, resulting in unstable verification together with reduction in reliability.

SUMMARY OF THE INVENTION

In view of the foregoing problems of the conventional recording mediums, it is an object of the present invention to provide a phase-change type optical recording medium which is capable of accurately carrying out simultaneous recording and verification, specifically carrying out verification by which it is confirmed whether data is properly recorded both in initial recording and over-recording.

Another object of the present invention is to provide a phase-change type optical recording medium which is capable of carrying out verification with high accuracy in smaller period of time to thereby make it possible to record data with higher reliability.

It is also an object of the present invention to provide a method of optically recording data by employing the above mentioned phase-change type optical recording medium.

In one aspect, there is provided a phase-change type optical recording medium, including (a) a substrate, (b) a recording layer formed on the substrate, phase condition of the recording layer being changed when a laser beam is radiated thereonto, to thereby record, erase or reproduce data into or from the recording layer, and (c) a reflection layer formed on the recording layer for reflecting a laser beam having been radiated onto the recording layer. The recording layer is formed so that the following equation (A) is established:

$$Rc > Rm > Ra \qquad (A)$$

wherein Rc indicates a reflectivity to be obtained when the recording layer is in crystal condition, Ra indicates a reflectivity to be obtained when the recording layer is in amorphous condition, and Rm indicates a reflectivity to be obtained when the recording layer is in mixed condition of molten condition and crystal or amorphous condition.

By arranging the recording layer to have a thickness such that the above mentioned equation (A) is established, it is possible to have recording sensitivity suitable for recording data into and reproduce data from an optical recording medium, and accomplish simultaneous recording and verification. In addition, the phase-change type optical recording medium is capable of providing high reproducing output, being accessible at a higher speed, and recording data at a higher density.

There is further provided a phase-change type optical recording medium, including (a) a substrate, (b) a recording layer formed on the substrate, phase condition of the recording layer being changed when a laser beam is radiated thereonto, to thereby record, erase or reproduce data into or from the recording layer, and (c) a reflection layer formed on the recording layer for reflecting a laser beam having been radiated onto the recording layer. The recording layer is formed so that the following equation (B) is established:

$$|Rc-Ra| \leq 5\%$$

$$Rc > Rm, Ra > Rm \qquad (B)$$

wherein Rc indicates a reflectivity to be obtained when the recording layer is in crystal condition, Ra indicates a reflectivity to be obtained when the recording layer is in amorphous condition, and Rm indicates a reflectivity to be obtained when the recording layer is in mixed condition of molten condition and crystal or amorphous condition.

Since the above mentioned equation (B) includes reflectivity in the laser beam spot as one of standards for judgement, it is surely confirmed as to whether the recording layer has a molten or recorded region in the laser beam spot by means of the phase-change type optical recording medium meeting the equation (B). Thus, it is possible to carry out verification while data is being recorded into the phase-change type optical recording medium.

For instance, if verification is to be carried out by employing RF signals obtained from reflected laser beams, it would be possible to obtain clearly distinguishable RF waveforms between when data is properly recorded and when data is not properly recorded. In addition, since RF waveforms obtained when data is properly recorded is stable, precise verification can be carried out. Furthermore, since a difference between Rc and Ra is arranged within 5% and Rm is arranged smaller than Rc and Ra, it would be possible to have the same RF waveforms even in over-recording as the waveforms obtained in initial recording, which ensures that accurate verification can be carried out similarly to verification in initial recording.

It would be possible to accurately carry out verification also by analyzing RF waveforms obtained immediately after a certain region of a recording layer in the laser beam spot commences to be molten. According to this mode of verification, a period of time necessary for verification can be shortened, and data can be recorded in initial recording or over-recording without reduction in transfer speed with higher reliability.

The above-mentioned equations (A) and (B) may be established in various ways. For instance, the substrate and recording layer may be designed to have a thickness so that the equation (A) or (B) is established. As an alternative, the substrate and recording layer may be made of particular material so that the equation (A) or (B) is established.

The phase-change type optical recording medium may further include a lower protection layer formed between the substrate and the recording layer, and an upper protection layer formed between the recording layer and the reflection layer, in which case the substrate, recording layer, lower protection layer and upper protection layer may be designed to have a thickness so that the equation (A) or (B) is established. As an alternative, the substrate, recording layer, lower protection layer and upper protection layer may be made of particular material so that the equation (A) or (B) is established.

A laser beam may be radiated to the phase-change type optical recording medium in any directions. However, it is preferable that a laser beam is radiated through the substrate for the purpose of simplification of a driver optical system and reduction of a recording apparatus in size.

The recording layer may be made of at least germanium (Ge), antimony (Sb) or tellurium (Te). The lower and upper protection layers may be made of any material suitable for optically recording medium. For instance, it is preferable that the lower and upper protection layers include $ZnSSiO_2$, SiN, SiO, $SiO_2$, $TaO_2$ or SiAlON. The reflecting layer may be made of any material suitable for optically recording medium. For instance, it is preferable that the reflecting layer includes Al, Ti, Ta, Cu, Au or Si as principal ingredient.

The phase-change type optical recording medium may further include additional layers. For instance, the phase-change type optical recording medium may further include an UV resin protection layer formed on the reflection layer. As an alternative, the phase-change type optical recording medium may further include an intermediate layer between the UV resin protection layer and the reflection layer, which intermediate layer is made of the same material as that of the lower protection layer. In the phase-change type optical recording medium, the reflection layer is required to have a thickness through which a laser beam can pass. The provision of the intermediate layer enhances designability in the phase-change type optical recording medium.

In the present invention, verification is carried out with higher accuracy by arranging a difference between Rc and Ra at a wavelength of a laser beam used for recording data to be within 5%. Hence, if a laser beam having a certain wavelength were commonly employed for both recording and reproducing data, it would not be possible to have a preferred C/N ratio by a difference between Rc and Ra. Thus, in order to have a preferred C/N ratio, the optical recording medium may be constructed so that a difference between Rc and Ra necessary for reproducing data having been recorded in the medium is able to be obtained by a wavelength for reproducing data. However, it is preferable that crystal and amorphous regions formed in the recording layer have a phase difference, in order that a common wavelength can be employed for both recording and reproducing data. It is preferable that a phase difference $\phi$ between crystal and amorphous regions both formed in the recording layer at a laser wavelength used for recording data meet the following equation (C).

$$30° \leq |\phi| \leq 180° \qquad (C)$$

The equation (C) may be established in various ways. For instance, the layers constituting the phase-change type optical recording medium may be designed to have a thickness or be made of particular material such that the equation (C) is established.

The phase-change type optical recording medium may be fabricated by means of conventional processes such as sputtering.

In another aspect, there is provided a method of optically recording data, including the steps of (a) preparing a phase-change type optical recording medium, the phase-change type optical recording medium comprising: a substrate; a recording layer formed on the substrate, phase condition of the recording layer being changed when a laser beam is radiated thereonto, to thereby record, erase or reproduce data into or from the recording layer; and a reflection layer formed on the recording layer for reflecting a laser beam having been radiated onto the recording layer, the recording layer being formed so that the following equation (A) is established:

$$Rc > Rm > Ra \qquad (A)$$

wherein Rc indicates a reflectivity to be obtained when the recording layer is in crystal condition, Ra indicates a reflectivity to be obtained when the recording layer is in amorphous condition, and Rm indicates a reflectivity to be obtained when the recording layer is in mixed condition of molten condition and crystal or amorphous condition, (b) radiating laser beam onto the recording layer, (c) monitoring laser beam reflected from the recording layer, and (d) judging whether data is properly recorded, based on how the reflected laser beam varies in an amount.

When laser beam having a predetermined intensity is radiated onto the recording layer, data may be judged to be properly recorded, if the reflected beam is suddenly reduced in an amount immediately after radiation of the laser beam.

There is further provided a method of optically recording data, including the steps of (a) preparing a phase-change type optical recording medium, the phase-change type optical recording medium comprising: a substrate; a recording layer formed on the substrate, phase condition of the recording layer being changed when a laser beam is radiated thereonto, to thereby record, erase or reproduce data into or from the recording layer; and a reflection layer formed on the recording layer for reflecting a laser beam having been radiated onto the recording layer, the recording layer being formed so that the following equation (B) is established:

$$|Rc-Ra| \leq 5\%$$

$$Rc > Rm, Ra > Rm \qquad (B)$$

wherein Rc indicates a reflectivity to be obtained when the recording layer is in crystal condition, Ra indicates a reflectivity to be obtained when the recording layer is in amorphous condition, and Rm indicates a reflectivity to be obtained when the recording layer is in mixed condition of molten condition and crystal or amorphous condition, (b) radiating laser beam onto the recording layer, (c) monitoring laser beam reflected from the recording layer, and (d) judging whether data is properly recorded, based on how the reflected laser beam varies in an amount.

It is preferable that the laser beam is radiated in pulse.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

[Embodiment 1]

Figure 1:
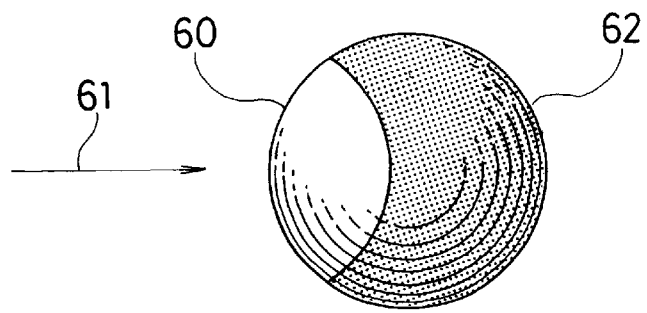
FIG. 1 is a schematic view illustrating laser beam spot radiated while data is being recorded into an optical disc medium.
Figure 2:
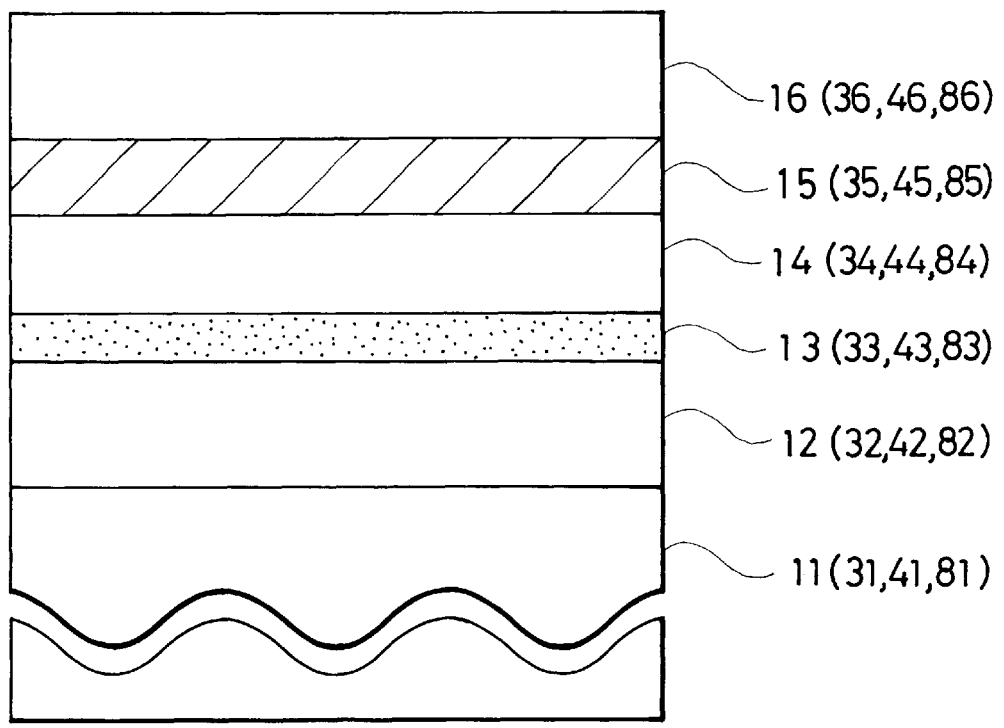
FIG. 2 is a cross-sectional view of an optical disc medium in accordance with the first to fourth embodiments of the present invention.

FIG. 2 illustrates a phase-change type optical disc medium in accordance with the first embodiment of the invention. The illustrated phase-change type optical disc medium has a transparent disc substrate 11 formed with a guide groove in a spiral form or guide grooves coaxially about a rotation axis of the disc substrate 11. There are formed on the disc substrate 11 on this order a lower protection layer 12 made of ZnSSiO$_2$ and having a thickness of 160 nm, a recording layer 13 made of GeSbTe and having a thickness of 15 nm, an upper protection layer 14 made of ZnSSiO$_2$ and having a thickness of 25 nm, a metal reflection layer 15 made of aluminum (Al) and having a thickness of 50 nm, and a UV resin protection layer 16. The layers 12 to 15 are deposited by sputtering.

The lower protection layer 12, the recording layer 13 and the upper protection layer 14 are designed to have a thickness so that the equation (A) is established:

$$Rc > Rm > Ra \quad (A)$$

wherein Rc indicates a reflectivity to be obtained when the recording layer 13 is in crystal condition, Ra indicates a reflectivity to be obtained when the recording layer 13 is in amorphous condition, and Rm indicates a reflectivity to be obtained when the recording layer 13 is in mixed condition of molten condition and crystal or amorphous condition. A laser beam radiated through the disc substrate 11 passes through the lower protection layer 12, the recording layer 13 and the upper protection layer 14, and then is reflected at the metal reflection layer 15. Thus, the laser beam is directed in the reverse direction. A part of the radiated laser beam is reflected at the recording layer 13, and thus directed in the reverse direction. Hence, a reflectivity of the recording layer 13 can be controlled by designing the layers 12, 13 and 14 to have a certain thickness.

Figure 3:
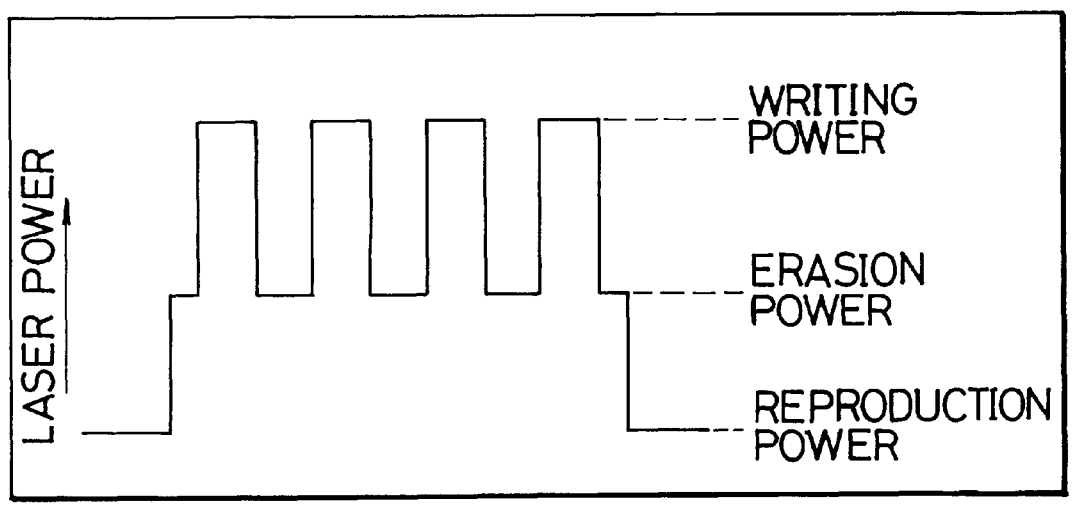
FIG. 3 is a schematic view illustrating waveforms of laser beams radiated while data is being recorded into an optical disc medium.

After the recording layer 13 was crystallized or initialized by radiating a laser beam at a linear velocity of 6 m/s and at erasion power of 6 mW to the optical disc medium, data was recorded into and reproduced from the phase-change type optical disc medium. Waveforms of laser beams used for recording data into the disc medium are illustrated in FIG. 3. The illustrated waveforms include reproduction power, erasion power, and recording power levels.

Figure 4:
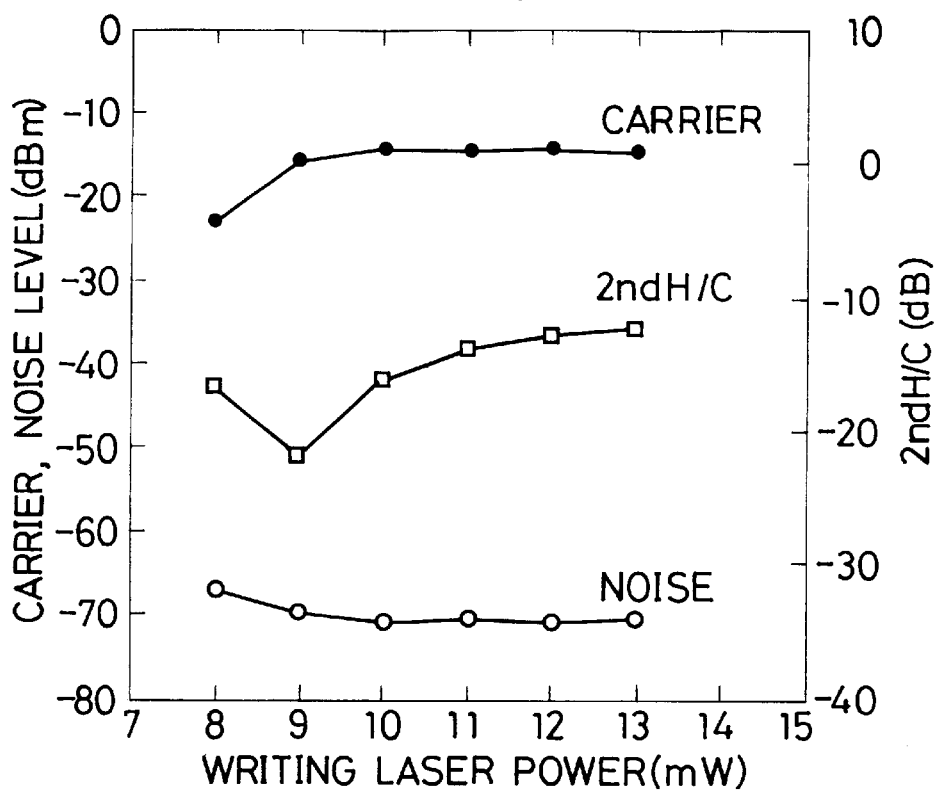
FIG. 4 is a graph showing relationship between recording laser power and carrier, noise and 2nd H/C levels in the first embodiment.

FIG. 4 shows the dependency of C/N ratios of carrier, noise and 2nd H/C levels on recording laser power, obtained when data was recorded into the disc medium in the following conditions:

Linear velocity; 6 m/s
Recording Frequency; 2 MHz
Duty Ratio; 50%
Reproduction Power; 1.0 mW
Erasion Power; 5.5 mW
Recording Power; 7.0–13.0 mW.

Figure 5:
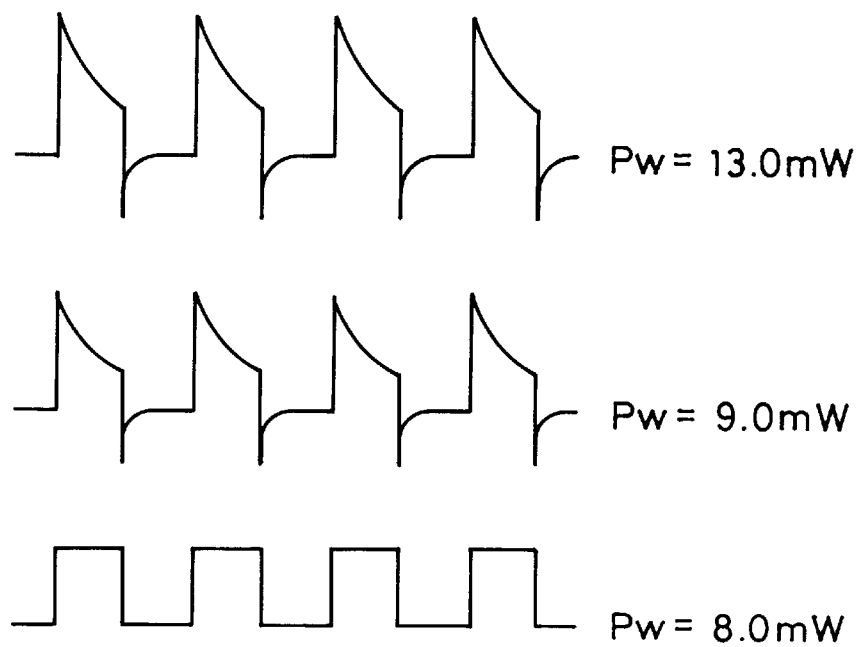
FIG. 5 is a schematic view illustrating RF signal waveforms in the first embodiment.

FIG. 5 illustrates waveforms of RF signals obtained from the reflected laser beams while data is being recorded into the disc medium.

In view of FIG. 4, it has been found out that a high C/N ratio is obtained because the layers 12 to 14 are designed to have a thickness so that a difference between the reflectivity Rc of a non-recorded or crystal region and the reflectivity Ra of a recorded or amorphous region is maximized.

It is found in FIG. 5 that the waveforms are quite different between when the recording laser power is greater than 9.0 mW and when the recording laser power is smaller than 9.0 mW. In FIG. 5, the waveform found when the recording laser power is 13.0 mW indicates that data is properly recorded into the disc medium, whereas the waveform found when the recording laser power is 8.0 mW indicates that data is not properly recorded into the disc medium.

Taking the waveforms illustrated in FIG. 5 into consideration together with FIGS. 3 and 4, the recording layer 13 is molten immediately after radiation of the recording laser power, and thus the reflectivity is reduced with the result of reduction in the reflected laser beam in the case of the recording laser power being 13.0 mW. When the recording laser power is varied to the erasion power level, the waveform changes into a unique shape as if undershoot occurs, because the reflectivity Rm of the recording laser beam spot including the molten region is smaller than the reflectivity Rc obtained when the recording layer is in non-recorded condition.

On the other hand, in the case of the recording laser power being smaller than 9.0 mW, specifically equal to 8.0 mW, the reflected laser beam is not reduced in an amount, because the recording layer 13 is not molten even if the recording laser power is increased up to the recording power level.

Thus, it is possible to judge whether data is properly recorded into the disc medium by monitoring RF signals generated while data is being recorded into the disc medium.

[Reference 1]

Figure 6:
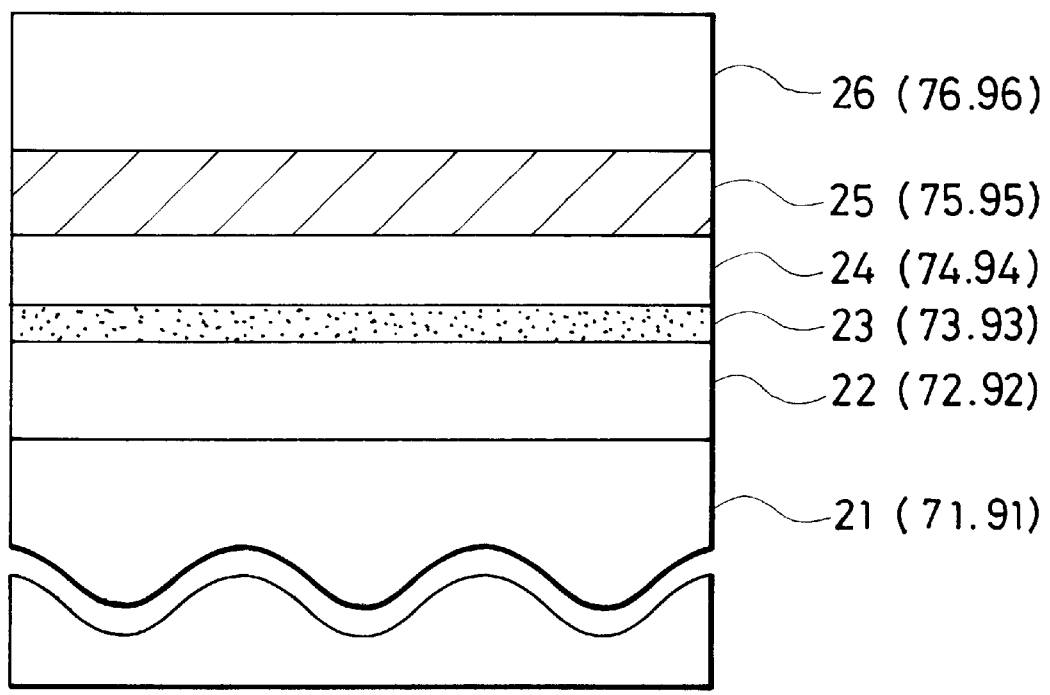
FIG. 6 is a cross-sectional view of an optical disc medium in the first to third reference example.

FIG. 6 illustrates a phase-change type optical disc medium as a reference example. The illustrated phase-change type optical disc medium has a transparent disc substrate 21, and there are formed on the disc substrate 21 on this order a lower protection layer 22 made of $ZnSSiO_2$ and having a thickness of 100 nm, a recording layer 23 made of GeSbTe and having a thickness of 10 nm, an upper protection layer 24 made of $ZnSSiO_2$ and having a thickness of 20 nm, a metal reflection layer 25 made of aluminum (Al) and having a thickness of 60 nm, and a UV resin protection layer 26. The layers 22 to 25 are deposited by sputtering, similarly to the phase-change type optical disc medium in accordance with the first embodiment.

After the recording layer 23 was crystallized or initialized by radiating a laser beam at a linear velocity of 6 m/s and at erasion power of 6 mW to the optical disc medium, data was recorded into and reproduced from the phase-change type optical disc medium. Waveforms of laser beams used for recording data into the disc medium are the same as those illustrated in FIG. 3.

Figure 7:
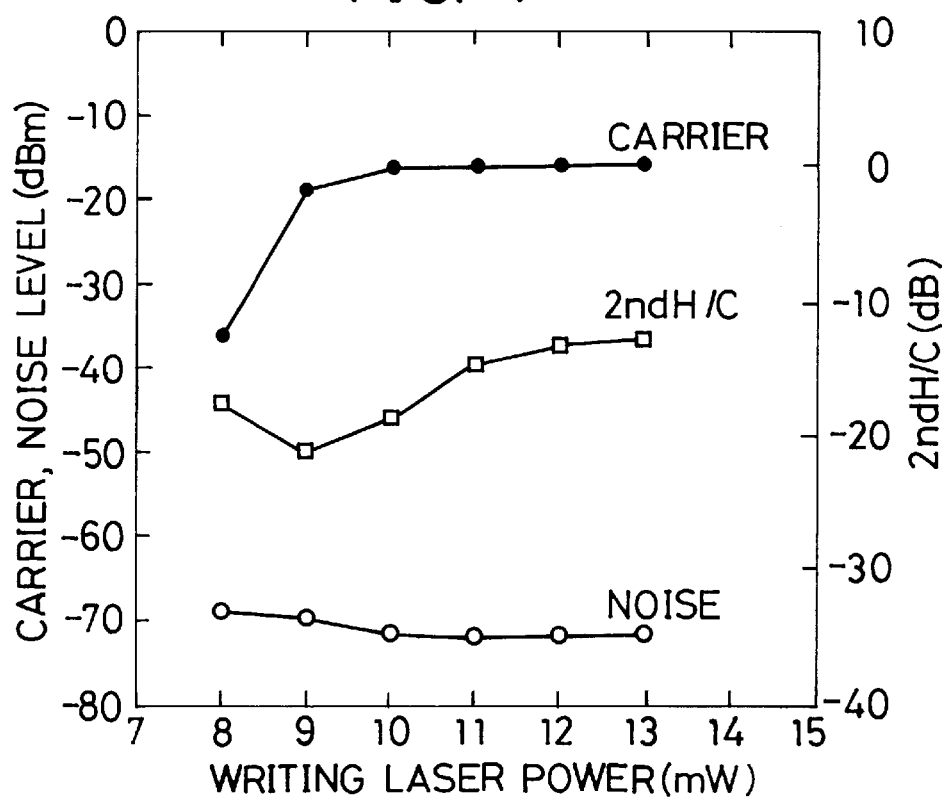
FIG. 7 is a graph showing relationship between recording laser power and carrier, noise and 2nd H/C levels in the first reference example.

FIG. 7 shows the dependency of C/N ratios on recording laser power, obtained when data was recorded into the disc medium in the following conditions:

Linear velocity; 6 m/s
Recording Frequency; 2 MHz
Duty Ratio; 50%
Reproduction Power; 1.0 mW
Erasion Power; 5.5 mW
Recording Power; 7.0–13.0 mW.

Figure 8:
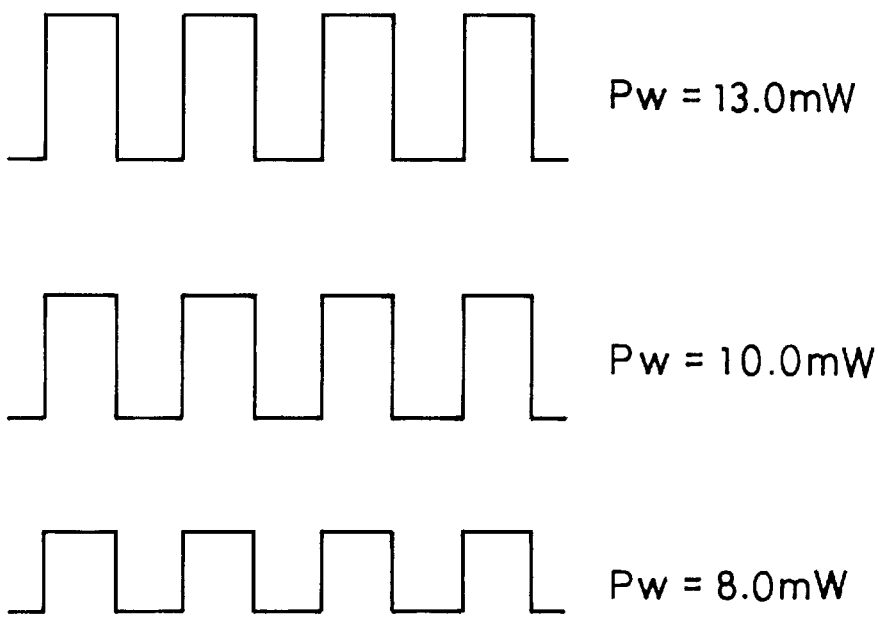
FIG. 8 is a schematic view illustrating RF signal waveforms in the first reference example.

FIG. 8 illustrates waveforms of RF signals obtained from the reflected laser beams while data is being recorded into the disc medium.

In this reference example, the layers 22 to 24 are designed to have a thickness so that the reflectivity Rc of a non-recorded or crystal region is almost equal to the reflectivity Ra of a recorded or amorphous region. However, since there exists a phase difference between the recorded and non-recorded regions, C/N ratios can be obtained for carrier, noise and 2nd I/C levels.

It is found in FIG. 8 that the waveform obtained when the recording laser power is greater than 9.0 mW is almost identical with the waveform obtained when the recording laser power is smaller than 9.0 mW. It is considered in view of FIG. 7 that data is properly recorded into the disc medium when the recording laser power is greater than 9.0 mW. However, the reflected laser beam is not reduced in an amount, even if the recording layer is molten immediately after radiation of the recording laser power, because the reflectivity Rm of the laser beam spot including the molten region is equal to both the reflectivity Rc of the non-recorded region and the reflectivity Ra of the recorded region. In addition, there cannot be found such a unique waveform where as if undershoot occurs as the waveform found in the optical disc medium in accordance with the first embodiment, even if the recording laser beam power is varied to the erasion power level, because the reflectivity Rm is equal to the reflectivity Rc.

On the other hand, in the case that the recording laser beam power is smaller than 9.0 mW where data is not properly recorded into the disc medium, the reflected laser beam is not reduced in an amount because the recording layer 23 is not molten, even if the laser beam power is increased up to the recording power level.

Thus, it is impossible to distinguish data being properly recorded into a disc medium from data being not properly recorded into a disc medium in the reference example, even if RF signals are monitored while data is being recorded into the disc medium.

[Embodiment 2]

Hereinbelow, a phase-change type optical disc medium in accordance with the second embodiment is explained. The optical disc medium in accordance with the second embodiment has the same layer structure as that of the optical disc medium in accordance with the first embodiment. With reference to FIG. 2 again, the phase-change type optical disc medium in accordance with the second embodiment has a transparent disc substrate 31. There are formed on the disc substrate 31 on this order a lower protection layer 32 made of $ZnSSiO_2$ and having a thickness of 170 nm, a recording layer 33 made of GeSbTe and having a thickness of 15 nm, an upper protection layer 34 made of $ZnSSiO_2$ and having a thickness of 15 nm, a metal reflection layer 35 made of aluminum (Al) and having a thickness of 50 nm, and a UV resin protection layer 16. The layers 32 to 35 are deposited by sputtering.

Similarly to the first embodiment, the lower protection layer 32, the recording layer 33 and the upper protection layer 34 are designed to have a thickness so that the equation (A) is established:

Rc>Rm>Ra    (A)

After the recording layer 33 was crystallized or initialized by radiating a laser beam at a linear velocity of 6 m/s and at erasion power of 6 mW to the optical disc medium, data was recorded into and reproduced from the phase-change type optical disc medium. Waveforms of laser beams used for recording data into the disc medium are the same as those illustrated in FIG. 3.

Figure 9:
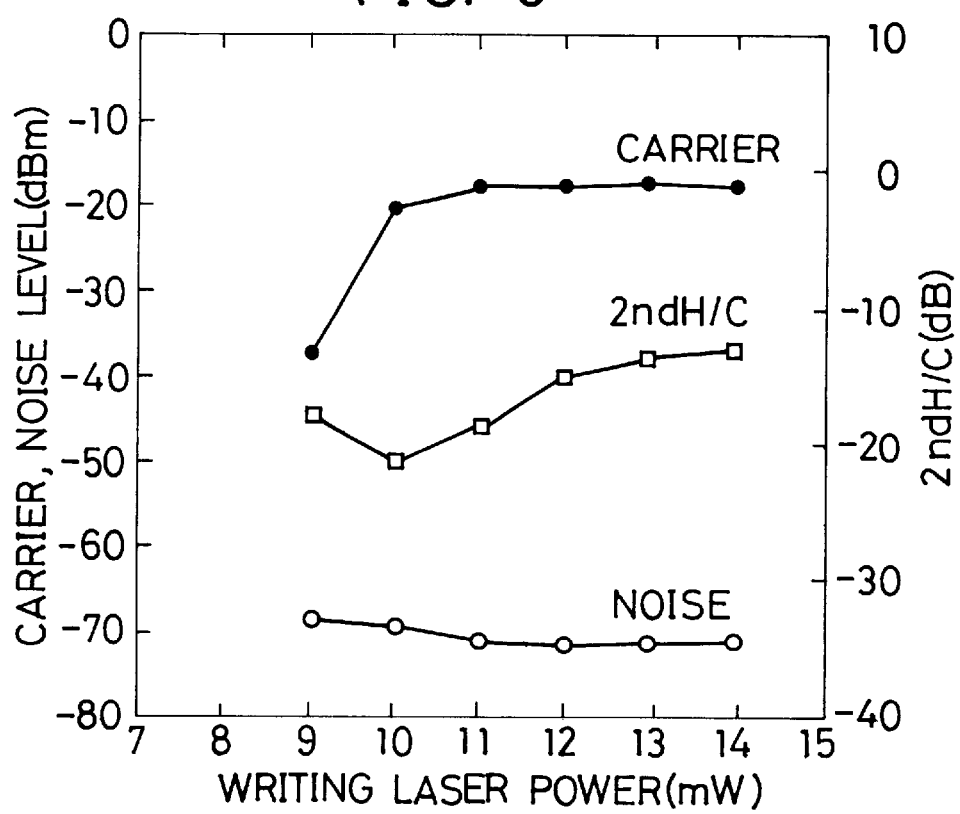
FIG. 9 is a graph showing relationship between recording laser power and carrier, noise and 2nd H/C levels in the second embodiment.

FIG. 9 shows the dependency of C/N ratios on recording laser power, obtained when data was recorded into the disc medium in the following conditions:

Linear velocity; 6 m/s

Recording Frequency; 4 MHz

Duty Ratio; 50%

Reproduction Power; 1.0 mW

Erasion Power; 5.5 mW

Recording Power; 9.0–14.0 mW.

Figure 10:
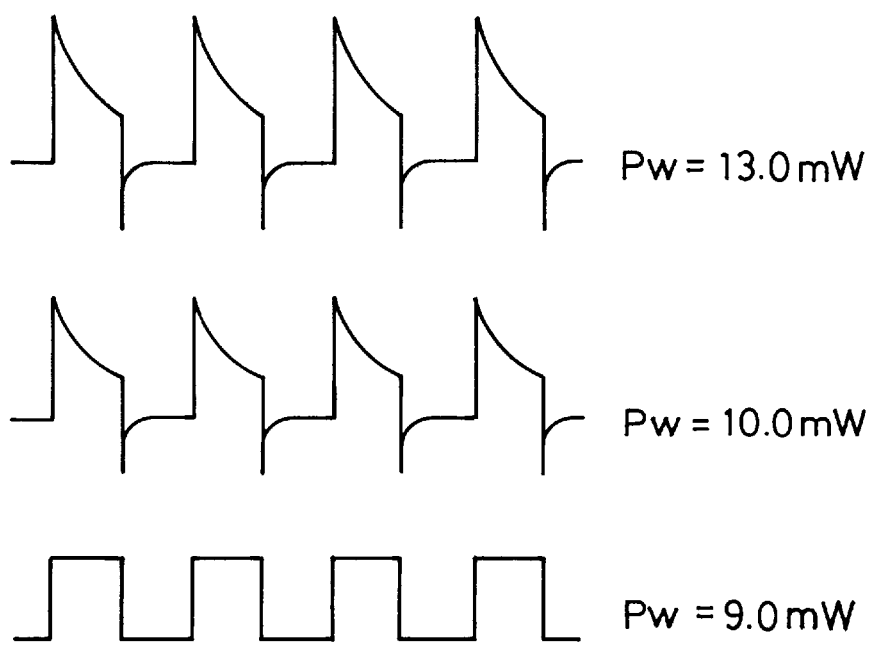
FIG. 10 is a schematic view illustrating RF signal waveforms in the second embodiment.

FIG. 10 illustrates waveforms of RF signals obtained from the reflected laser beams while data is being recorded into the disc medium.

In view of FIG. 9, it has been found out that a high C/N ratio is obtained because the layers 32 to 34 are designed to have a thickness so that a difference between the reflectivity Rc of a non-recorded or crystal region and the reflectivity Ra of a recorded or amorphous region is maximized.

It is found in FIG. 10 that the waveforms are quite different between when the recording laser power is greater than 10.0 mW and when the recording laser power is smaller than 10.0 mW. Similarly to the waveforms illustrated in FIG. 5, the waveform found when the recording power is 13.0 mW indicates that data is properly recorded into the disc medium, whereas the waveform found when the recording power is 9.0 mW indicates that data is not properly recorded into the disc medium.

Taking the waveforms illustrated in FIG. 10 into consideration together with FIGS. 3 and 9, the recording layer 33 is molten immediately after radiation of the recording laser power, and thus the reflectivity is reduced with the result of reduction in the reflected laser beam in an amount in the case that the recording laser power is greater than 10.0 mW. When the recording laser power is varied to the erasion power level, the waveform changes into a unique shape as if undershoot occurs, because the reflectivity Rm of the recording laser beam spot including the molten region is smaller than the reflectivity Rc obtained when the recording layer 33 is in non-recorded condition.

On the other hand, in the case that the recording laser power is smaller than 10.0 mW, specifically equal to 9.0 mW, the reflected laser beam is not reduced in an amount, because the recording layer 33 is not molten even if the recording laser power is increased up to the recording power level.

Thus, it is possible to judge whether data is properly recorded into the disc medium by monitoring RF signals generated while data is being recorded into the disc medium.

[Embodiment 3]

Hereinbelow, a phase-change type optical disc medium in accordance with the third embodiment is explained. The optical disc medium in accordance with the third embodiment has the same layer structure as that of the optical disc medium in accordance with the first embodiment. With reference to FIG. 2 again, the phase-change type optical disc medium in accordance with the third embodiment has a transparent disc substrate 41 made of polycarbonate and having a thickness of 1.2 mm. There are formed on the disc substrate 41 on this order a lower protection layer 42 made of $ZnSiO_2$ and having a thickness of 110 nm, a recording layer 43 made of GeSbTe and having a thickness of 16 nm, an upper protection layer 44 made of $ZnSSiO_2$ and having a thickness of 80 nm, a metal reflection layer 45 made of aluminum (Al) and having a thickness of 50 nm, and a UV resin protection layer 16. The layers 42 to 45 are deposited by sputtering. A laser beam employed herein for recording data into the optical disc medium has a wavelength of 685 nm±10 nm.

A designed reflectivity in accordance with phase conditions of the recording layer 43 and a phase difference between crystal and amorphous regions in the recording layer 43 are as shown in Table 1 described later.

The lower protection layer 42, the recording layer 43 and the upper protection layer 44 are designed to have a thickness so that the equation (B) is established:

|Rc–Ra|≦5%

Rc>Rm, Ra>Rm    (B)

wherein Rc indicates a reflectivity to be obtained when the recording layer 43 is in crystal condition, Ra indicates a reflectivity to be obtained when the recording layer 43 is in amorphous condition, and Rm indicates a reflectivity to be obtained when the recording layer 43 is in mixed condition of molten condition and crystal or amorphous condition.

After the recording layer 43 was crystallized or initialized by radiating a laser beam at a linear velocity of 6 m/s and at erasion power of 6 mW to the optical disc medium, data was recorded into and reproduced from the phase-change type optical disc medium. Waveforms of laser beams used for recording data into the disc medium are as illustrated in FIG. 3, similarly to the first and second embodiments. The waveforms include reproduction power, erasion power, and recording power levels.

Figure 11:
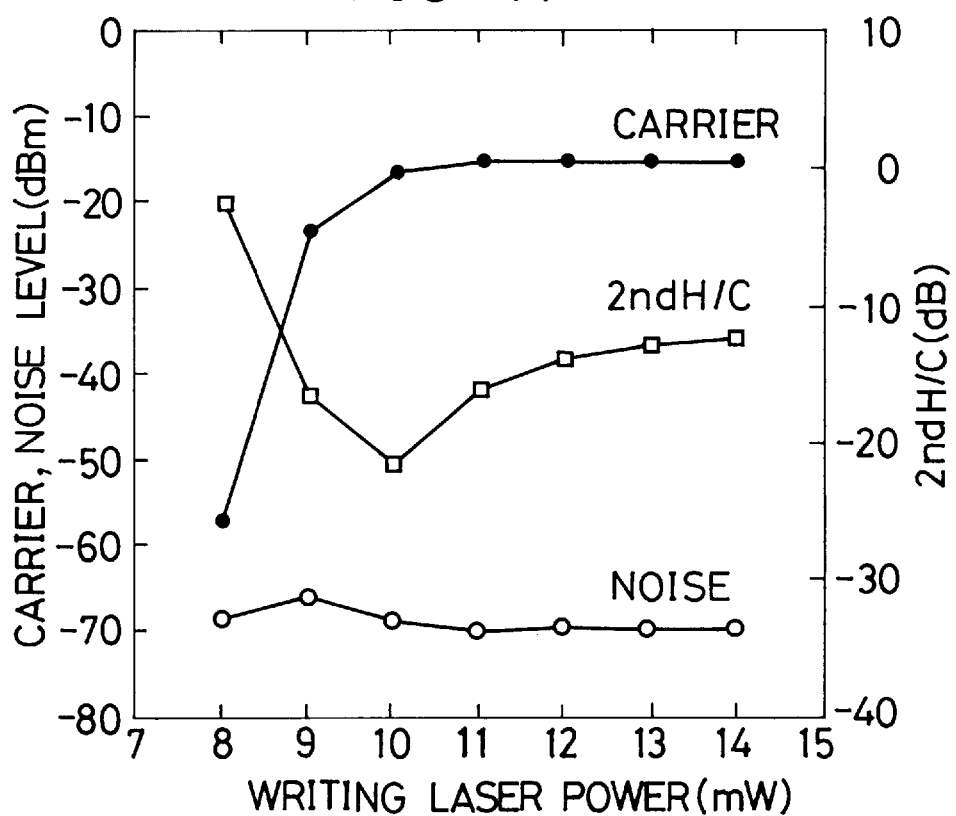
FIG. 11 is a graph showing relationship between recording laser power and carrier, noise and 2nd H/C levels in the third embodiment.

FIG. 11 shows the dependency of carrier, noise and 2nd H/C levels on recording laser power, obtained when data was recorded into the optical disc medium in the following conditions:

Linear velocity; 6 m/s

Recording Frequency; 2 MHz

Duty Ratio; 50%

Reproduction Power; 1.0 mW

Erasion Power; 5.5 mW

Recording Power; 7.0–13.0 mW.

Figure 12:
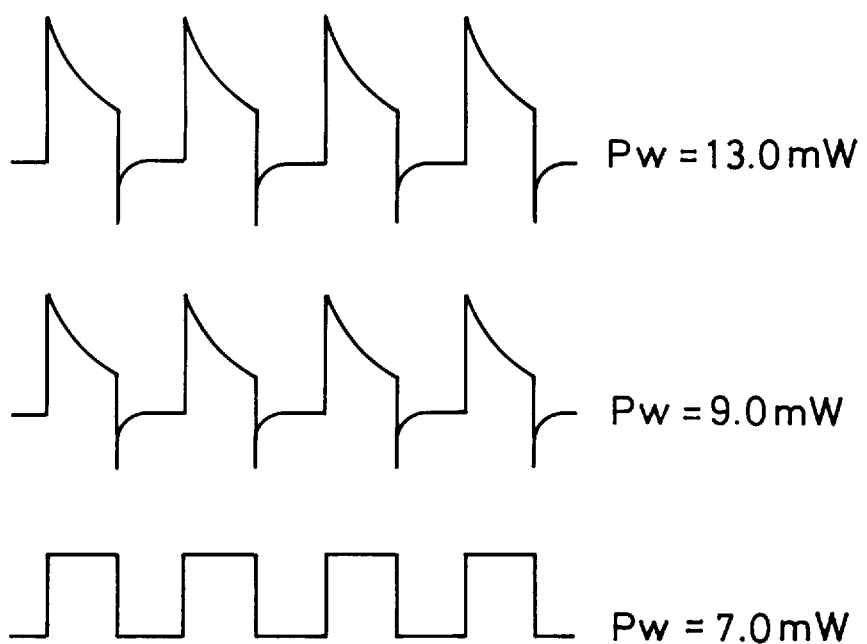
FIG. 12 is a schematic view illustrating RF signal waveforms obtained when data is being first recorded into the optical disc medium in accordance with the third embodiment.
Figure 13:
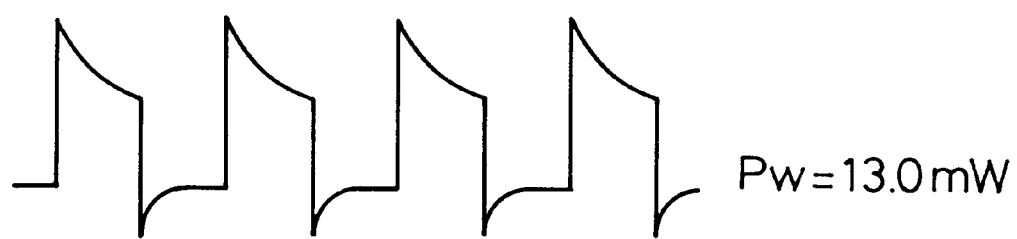
FIG. 13 is a schematic view illustrating RF signal waveforms obtained when data is being over-recorded into the optical disc medium in accordance with the third embodiment.
Figure 13:
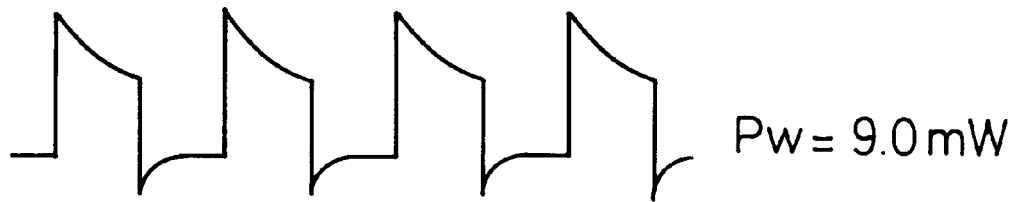
Figure 13:
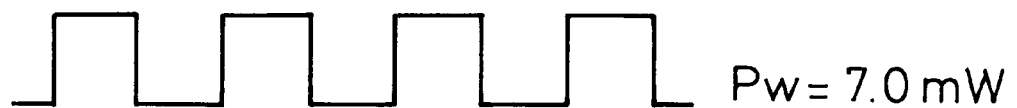

FIG. 12 illustrates waveforms of RF signals obtained from the reflected laser beams while data is being first recorded into the disc medium. FIG. 13 illustrates waveforms of RF signals obtained from the reflected laser beams while data is being over-recorded into the disc medium.

In view of FIG. 11, it has been found out that a high C/N ratio is obtained because there is selected an appropriate phase difference between crystal and amorphous regions, though the layers 12 to 14 are designed to have a thickness so that the reflectivity Rc of a non-recorded or crystal region is almost equal to the reflectivity Ra of a recorded or amorphous region.

It is found in FIG. 12 that the waveforms of RF signals are quite different between when the recording laser power is greater than 9.0 mW and when the recording laser power is smaller than 8.0 mW. In FIG. 12, the waveform found when the recording laser power is 13.0 mW indicates that data is properly recorded into the disc medium, whereas the waveform found when the recording laser power is 7.0 mW indicates that data is not properly recorded into the disc medium.

Taking the waveforms illustrated in FIG. 12 into consideration together with FIGS. 3 and 11, the recording layer 43 is molten immediately after radiation of the recording laser power, and thus the reflectivity is reduced with the result of reduction in the reflected laser beam in an amount in the case of the recording laser power being greater than 9.0 mW. When the recording laser power is varied to the erasion power level, the waveform changes into a unique shape as if undershoot occurs, because the reflectivity Rm of the recording laser beam spot including the molten region is smaller than the reflectivity Rc obtained when the recording layer 43 is in non-recorded condition.

On the other hand, in the case of the recording laser power being smaller than 8.0 mW, specifically equal to 7.0 mW, the reflected laser beam is not reduced in an amount, because the recording layer 43 is not molten, even if the recording laser power is increased up to the recording power level.

It is also found in FIG. 13 illustrating waveforms of RF signals in over-recording that the waveforms of RF signals are quite different between when the recording laser power is greater than 9.0 mW and when the recording laser power is smaller than 8.0 mW. The recording layer 43 is molten immediately after radiation of the recording laser power, and thus the reflectivity is reduced with the result of reduction in the reflected laser beam in an amount in the case that the recording laser power is greater than 9.0 mW. When the recording laser power is varied to the erasion power level, the waveform changes into a unique shape as if undershoot occurs, because the reflectivity Rm of the recording laser beam spot including the molten region is smaller than the reflectivity in the previous condition, namely, the reflectivity Ra for the recorded region or the reflectivity Rc for the non-recorded region.

On the other hand, in the case that the recording laser power is smaller than 9.0 mW, specifically equal to 7.0 mW, the reflected laser beam keeps unchanged in an amount, because the recording layer 43 is not molten, even if the recording laser power is increased up to the recording power level, and also because the reflectivity Rc of the crystal region is almost equal to the reflectivity Ra of the amorphous region. In addition, the waveforms (FIG. 13) of RF signals obtained in over-recording are almost identical with the waveforms (FIG. 12) of RF signals obtained when data is first recorded into the optical disc medium.

Thus, it is possible to judge whether data is properly recorded into the disc medium both in first recording and over-recording by monitoring RF signals generated while data is being recorded into the disc medium.

Figure 14:
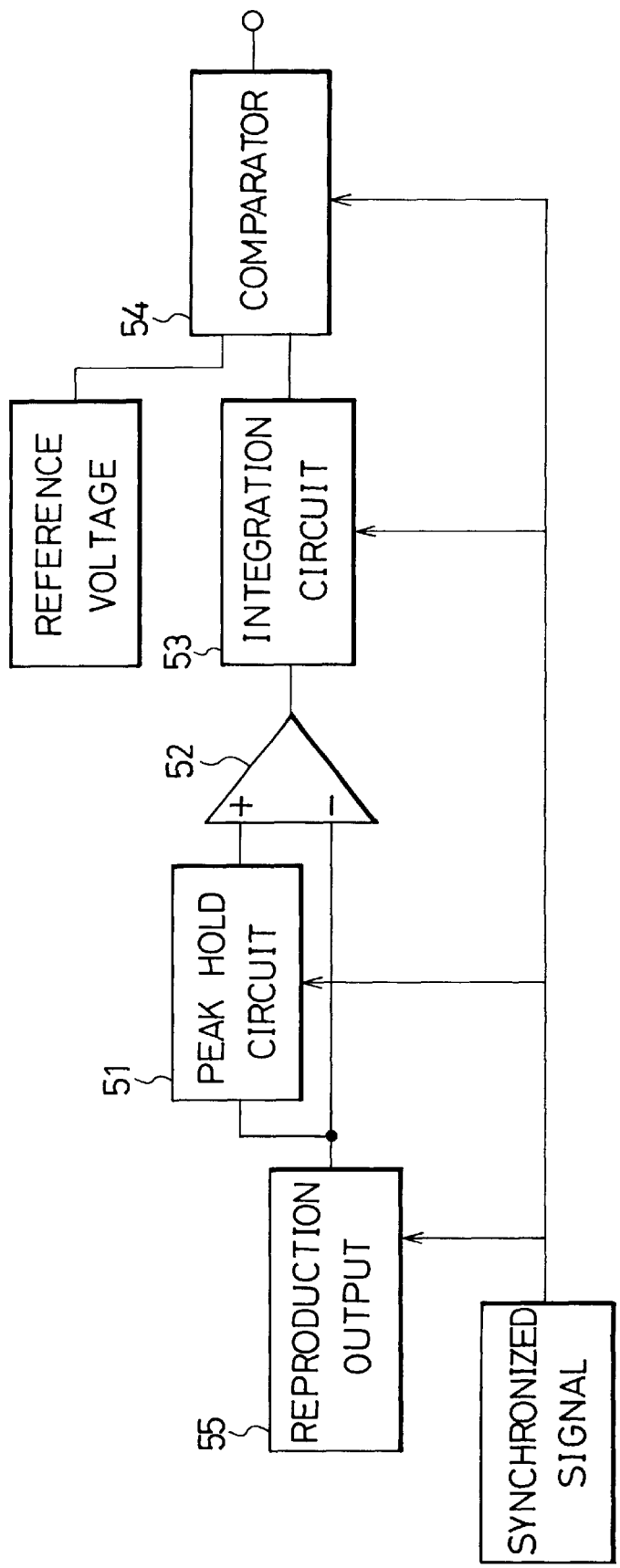
FIG. 14 is a block diagram of a circuit for judging whether data is properly recorded into an optical disc medium.

FIG. 14 is a block diagram of a circuit for judging whether data is properly recorded into the optical disc medium. The illustrated circuit includes a peak hold circuit 51, an operational amplifier 52, an integration circuit 53 and a comparator 54. Synchronized signals are transmitted to the peak hold circuit 51, the integration circuit 53 and the comparator 54. In the illustrated circuit, an attention is paid to how reproduction outputs 55 or RF signals are varied immediately after rise-up of recording pulses. The reproduction outputs 55 are introduced into the operational amplifier 52 together with outputs from the peak hold circuit 51, and then an output from the operational amplifier 52 is integrated in the integration circuit 53. The integration is introduced into the comparator 54, and then compared to a reference voltage in the comparator 54.

If a recording layer in a laser beam spot were molten, the comparator 54 transmits an output, because there can be obtained a waveform which would be generated when the recording laser power is greater than 9.0 mW, as illustrated in FIGS. 12 and 13. Thus, verification can be accomplished while data is being recorded into an optical disc medium. If verification is accomplished based on variation of the reproduction output immediately after rise-up of recording pulses, it is possible to shorten a time necessary for verification, ensuring data recording with higher reliability and without reduction in data-recording speed.

[Reference 2]

Hereinbelow is explained a phase-change type optical disc medium as a reference example. The phase-change type optical disc medium as a reference example has the same structure except thicknesses of the substrate and layers. With reference to FIG. 6 again, the phase-change type optical disc medium as a reference example has a transparent disc substrate 71 made of polycarbonate and having a thickness of 1.2 mm. There are formed on the disc substrate 71 on this order a lower protection layer 72 made of $ZnSSiO_2$ and having a thickness of 160 nm, a recording layer 73 made of GeSbTe and having a thickness of 14 nm, an upper protection layer 74 made of $ZnSSiO_2$ and having a thickness of 20 nm, a metal reflection layer 75 made of aluminum (Al) and having a thickness of 60 nm, and a UV resin protection layer 76. The layers 72 to 75 are deposited by sputtering. A laser beam employed herein for recording data into the optical disc medium has a wavelength of 685 nm+10 nm.

A designed reflectivity in accordance with phase conditions of the recording layer 73 and a phase difference between crystal and amorphous regions in the recording layer 73 are as shown in Table 1 described later.

After the recording layer 73 was crystallized or initialized by radiating a laser beam at a linear velocity of 6 m/s and at erasion power of 6 mW to the optical disc medium, data was recorded into and reproduced from the phase-change type optical disc medium. Waveforms of laser beams used for recording data into the disc medium are as illustrated in FIG.

3, similarly to the first to third embodiments. The waveforms include reproduction power, erasion power, and recording power levels.

Figure 15:
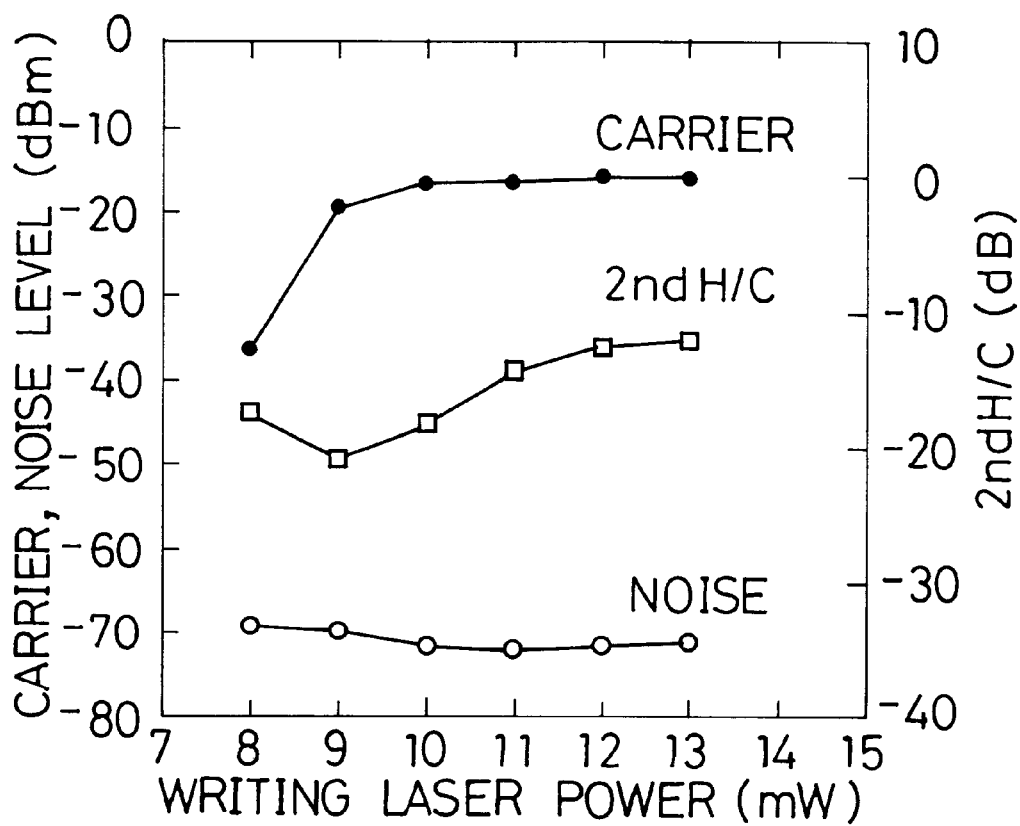
FIG. 15 is a graph showing relationship between recording laser power and carrier, noise and 2nd H/C levels in the second reference example.

FIG. 15 shows the dependency of carrier, noise and 2nd H/C levels on recording laser power, obtained when data was recorded into the optical disc medium in the following conditions:

Linear velocity; 6 m/s
Recording Frequency; 2 MHz
Duty Ratio; 50%
Reproduction Power; 1.0 mW
Erasion Power; 5.5 mW
Recording Power; 8.0–13.0 mW.

Figure 16:
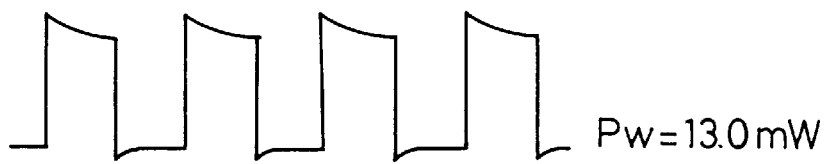
FIG. 16 is a schematic view illustrating RF signal waveforms obtained when data is being first recorded into the optical disc medium in accordance with the second reference example.
Figure 16:
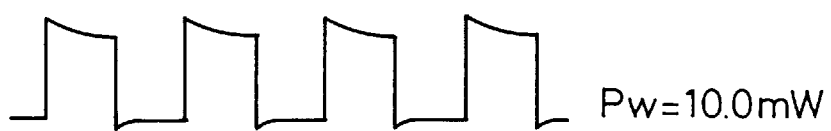
Figure 16:
Figure 17:
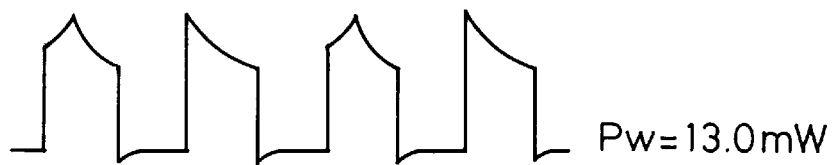
FIG. 17 is a schematic view illustrating RF signal waveforms obtained when data is being over-recorded into the optical disc medium in accordance with the second reference example.
Figure 17:
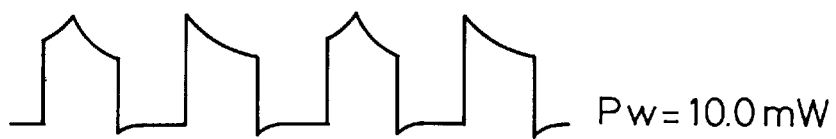
Figure 17:
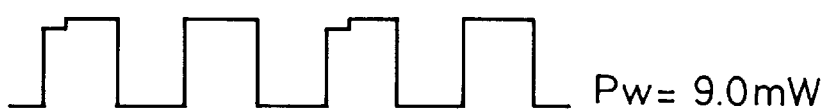

FIG. 16 illustrates waveforms of RF signals obtained from the reflected laser beams while data is being first recorded into the optical disc medium, and FIG. 17 illustrates waveforms of RF signals obtained from the reflected laser beams while data is being over-recorded into the optical disc medium.

In this reference example, C/N ratios can be obtained for carrier, noise and 2nd H/C levels by designing the layers 72 to 74 to have a thickness so that a difference between the reflectivity Rc of a non-recorded or crystal region and the reflectivity Ra of a recorded or amorphous region is large.

It is found in FIG. 16 that the waveform of RF signals obtained when the recording laser power is greater than 10.0 mW is quite different from the waveform obtained when the recording laser power is smaller than 10.0 mW. Taking the waveforms illustrated in FIG. 16 into consideration together with FIGS. 3 and 15, the recording layer 73 is molten immediately after radiation of the recording laser power, and thus the reflectivity is reduced with the result of reduction in the reflected laser beam in an amount in the case that the recording laser power is greater than 10.0 mW where data is properly recorded into the optical disc medium. Even when the recording laser power is varied to the erasion power level, the waveform does not change into the unique shape like as if undershoot occurs, as found in the first to third embodiments, because the reflectivity Rm of the recording laser beam spot including the molten region is not so different from the reflectivity Rc obtained when the recording layer 73 is in non-recorded condition.

On the other hand, in the case of the recording laser power being smaller than 10.0 mW, the reflected laser beam is not reduced in an amount, because the recording layer 73 is not molten, even if the recording laser power is increased up to the recording power level.

It is also found in FIG. 17 illustrating waveforms of RF signals in over-recording that the reflected laser beam is changed in an amount in accordance with a difference prior to over-recording between the reflectivity Ra of a recorded region and the reflectivity Rc of a non-recorded region, because the recording layer 73 is not molten, even if the recording laser power is increased up to the recording power level.

When the recording laser power is greater than 10.0 mW where data is properly recorded into the optical disc medium, the reflectivity is reduced due to the recording layer being molten, resulting in that the reflected laser beam is reduced in an amount. However, there can be seen significant fluctuation in the waveform immediately after the rise-up of recording pulses. The fluctuation is caused by a great difference prior to over-recording between the reflectivity Rc of a crystal region and the reflectivity Ra of an amorphous region. The fluctuation is of almost the same degree as the fluctuation in reflectivity caused by the melting of the recording layer.

When the recording laser beam power is varied to the erasion power level, the waveform may be changed into the unique shape as if undershoot occurs, because the reflectivity Rm of a recording laser beam spot including a molten region may become larger or smaller than the reflectivity Ra for a recorded region or the reflectivity Rc for a non-recorded region. However, there can be still found significant fluctuation. In particular, paying attention to the fluctuation found immediately after rise-up of the recording pulses, there is not found clear and characteristic reduction in RF signals as found in the third embodiment, even though the recording layer 73 commences to be molten, in which case it is impossible to precisely judge whether data is properly recorded into the optical disc medium or not. As a result, it would be quite difficult or almost impossible to judge whether data is properly over-recorded into the optical disc medium, even if RF signals are monitored while data is being over-recorded into the medium.

[Embodiment 4]

Hereinbelow, a phase-change type optical disc medium in accordance with the fourth embodiment is explained. The optical disc medium in accordance with the fourth embodiment has the same layer structure as that of the optical disc medium in accordance with the first embodiment except thicknesses of the substrate and layers. With reference to FIG. 2 again, the phase-change type optical disc medium in accordance with the fourth embodiment has a transparent disc substrate 81 made of polycarbonate and having a thickness of 0.6 mm. There are formed on the disc substrate 81 on this order a lower protection layer 82 made of $ZnSSiO_2$ and having a thickness of 140 nm, a recording layer 83 made of GeSbTe and having a thickness of 12 nm, an upper protection layer 84 made of $ZnSSiO_2$ and having a thickness of 60 nm, a metal reflection layer 85 made of aluminum (Al) and having a thickness of 60 nm, and a UV resin protection layer 86. The layers 82 to 85 are deposited by sputtering. A laser beam employed herein for recording data into the optical disc medium has a wavelength of 640 nm±10 nm.

A designed reflectivity in accordance with phase conditions of the recording layer 43 and a phase difference between crystal and amorphous regions in the recording layer 43 are as shown in Table 1 described later.

The lower protection layer 82, the recording layer 83 and the upper protection layer 84 are designed to have a thickness so that the equation (B) is established:

$|Rc-Ra| \leq 5\%$ $Rc > Rm, Ra > Rm$ (B)

After the recording layer 83 was crystallized or initialized by radiating a laser beam at a linear velocity of 6 m/s and at erasion power of 6 mW to the optical disc medium, data was recorded into and reproduced from the phase-change type optical disc medium. Waveforms of laser beams used for recording data into the disc medium are as illustrated in FIG. 3, similarly to the first and second embodiments. The waveforms include reproduction power, erasion power, and recording power levels.

Figure 18:
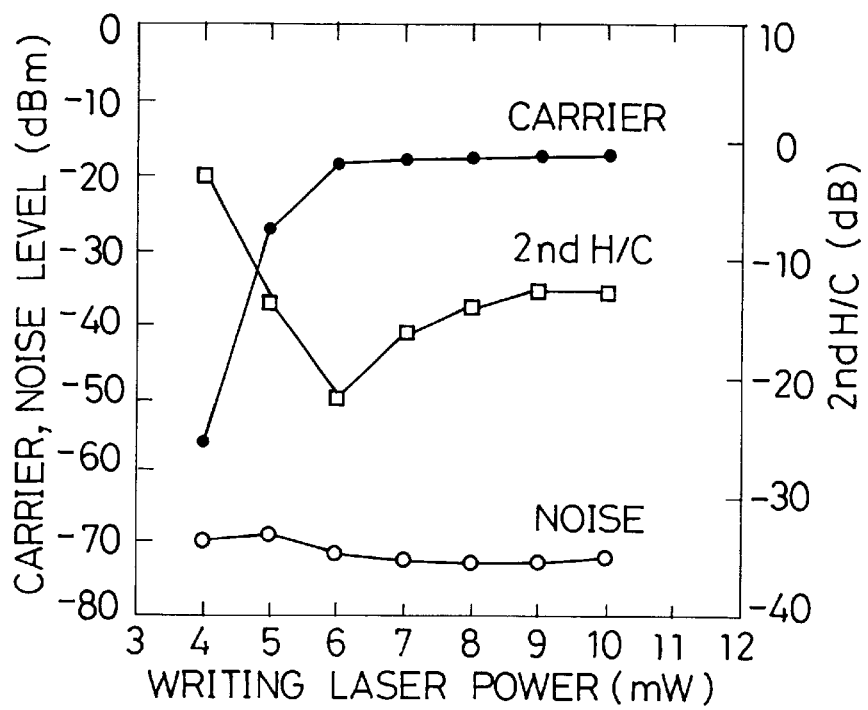
FIG. 18 is a graph showing relationship between recording laser power and carrier, noise and 2nd H/C levels in the fourth embodiment.

FIG. 18 shows the dependency of carrier, noise and 2nd H/C levels on recording laser power, obtained when data was recorded into the optical disc medium in the following conditions:

Linear velocity; 6 m/s
Recording Frequency; 2 MHz
Duty Ratio; 50%
Reproduction Power; 1.0 mW Erasion Power; 3.5 mW
Recording Power; 4.0–10.0 mW.

Figure 19:
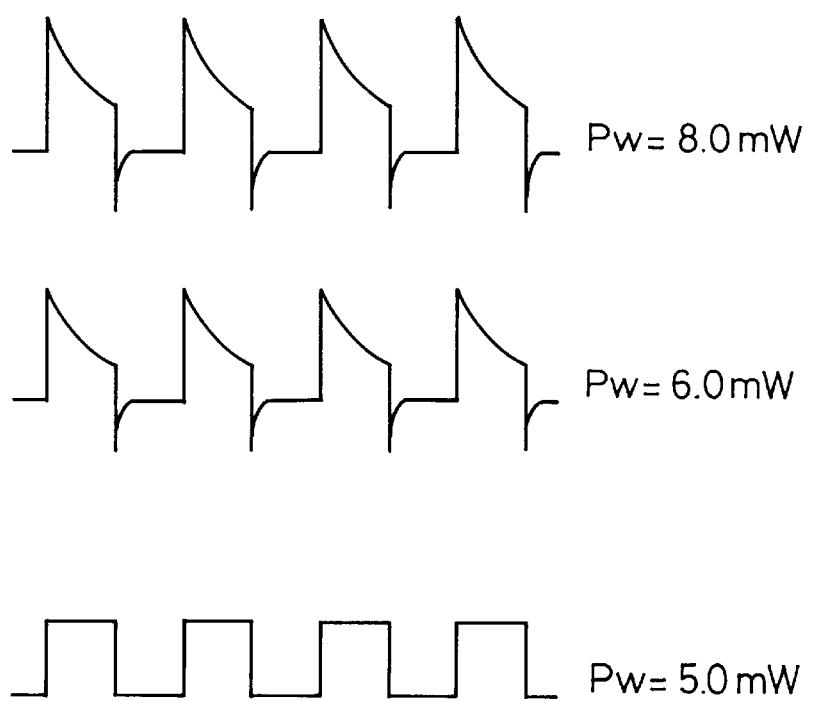
FIG. 19 is a schematic view illustrating RF signal waveforms obtained when data is being first recorded into the optical disc medium in accordance with the fourth embodiment.
Figure 20:
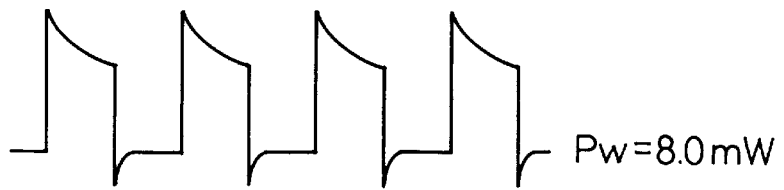
FIG. 20 is a schematic view illustrating RF signal waveforms obtained when data is being over-recorded into the optical disc medium in accordance with the fourth embodiment.
Figure 20:
Figure 20:

FIG. 19 illustrates waveforms of RF signals obtained from the reflected laser beams while data is being first recorded into the disc medium. FIG. 20 illustrates waveforms of RF signals obtained from the reflected laser beams while data is being over-recorded into the disc medium.

Though the layers 82 to 84 are designed to have a thickness so that the reflectivity Rc of a crystal or non-recorded region is almost equal to the reflectivity Ra of an amorphous or recorded region at a wavelength of a laser beam employed for recording and reproducing data, there can be obtained a preferred C/N ratio, since there is a phase difference between the crystal and amorphous regions.

It is found in FIG. 19 that the waveforms of RF signals are quite different between when the recording laser power is greater than 6.0 mW and when the recording laser power is smaller than 6.0 mW. Taking the waveforms illustrated in FIG. 19 into consideration together with FIGS. 3 and 18, it is considered that data is properly recorded into the disc medium when the recording laser power is greater than 6.0 mW. When the recording laser power is greater than 6.0 mW, the recording layer 83 is molten immediately after radiation of the recording laser power, and thus the reflectivity is reduced with the result of reduction in the reflected laser beam in an amount. When the recording laser power is varied to the erasion power level, the waveform changes into a unique shape as if undershoot occurs, because the reflectivity Rm of the recording laser beam spot including the molten region is smaller than both the reflectivity Rc obtained when the recording layer 83 is in non-recorded condition and the reflectivity Ra obtained when the recording layer 83 is in recorded condition.

On the other hand, in the case that the recording laser power is smaller than 6.0 mW where data is not properly recorded into the optical disc medium, the reflected laser beam is not reduced in an amount, because the recording layer 83 is not molten, even if the recording laser power is increased up to the recording power level.

It is also found in FIG. 20 illustrating waveforms of RF signals in over-recording that the waveforms of RF signals are quite different between when the recording laser power is greater than 6.0 mW and when the recording laser power is smaller than 6.0 mW. The recording layer 83 is molten immediately after radiation of the recording laser power, and thus the reflectivity is reduced with the result of reduction in the reflected laser beam in an amount in the case that the recording laser power is greater than 6.0 mW. When the recording laser power is varied to the erasion power level, the waveform changes into a unique shape as if undershoot occurs, because the reflectivity Rm of the recording laser beam spot including the molten region is smaller than the reflectivity in the previous condition, namely, the reflectivity Ra for the recorded region or the reflectivity Rc for the non-recorded region.

On the other hand, in the case that the recording laser power is smaller than 6.0 mW, specifically equal to 5.0 mW, the reflected laser beam keeps unchanged in an amount, because the recording layer 83 is not molten, even if the recording laser power is increased up to the recording power level, and also because the reflectivity Rc of the crystal region is almost equal to the reflectivity Ra of the amorphous region.

Thus, it is possible to judge whether data is properly recorded into the disc medium both in first recording and over-recording by monitoring RF signals generated while data is being recorded into the disc medium.

[Reference 3]

Hereinbelow is explained a phase-change type optical disc medium as a reference example in comparison with the phase-change type optical disc medium in accordance with the embodiment 4. The phase-change type optical disc medium as a reference example has the same structure except thicknesses of the substrate and layers. With reference to FIG. 6 again, the phase-change type optical disc medium as a reference example has a transparent disc substrate 91 made of polycarbonate and having a thickness of 1.2 mm. There are formed on the disc substrate 91 on this order a lower protection layer 92 made of $ZnSSiO_2$ and having a thickness of 110 nm, a recording layer 93 made of GeSbTe and having a thickness of 14 nm, an upper protection layer 94 made of $ZnSSiO_2$ and having a thickness of 30 nm, a metal reflection layer 95 made of aluminum (Al) and having a thickness of 60 nm, and a UV resin protection layer 96. The layers 92 to 95 are deposited by sputtering. A laser beam employed herein for recording data into the optical disc medium has a wavelength of 640 nm±10 nm.

A designed reflectivity in accordance with phase conditions of the recording layer 93 and a phase difference between crystal and amorphous regions in the recording layer 93 are as shown in Table 1 described later.

After the recording layer 73 was crystallized or initialized by radiating a laser beam at a linear velocity of 6 m/s and at erasion power of 6 mW to the optical disc medium, data was recorded into and reproduced from the phase-change type optical disc medium. Waveforms of laser beams used for recording data into the disc medium are as illustrated in FIG. 3, similarly to the first to fourth embodiments. The waveforms include reproduction power, erasion power, and recording power levels.

Figure 21:
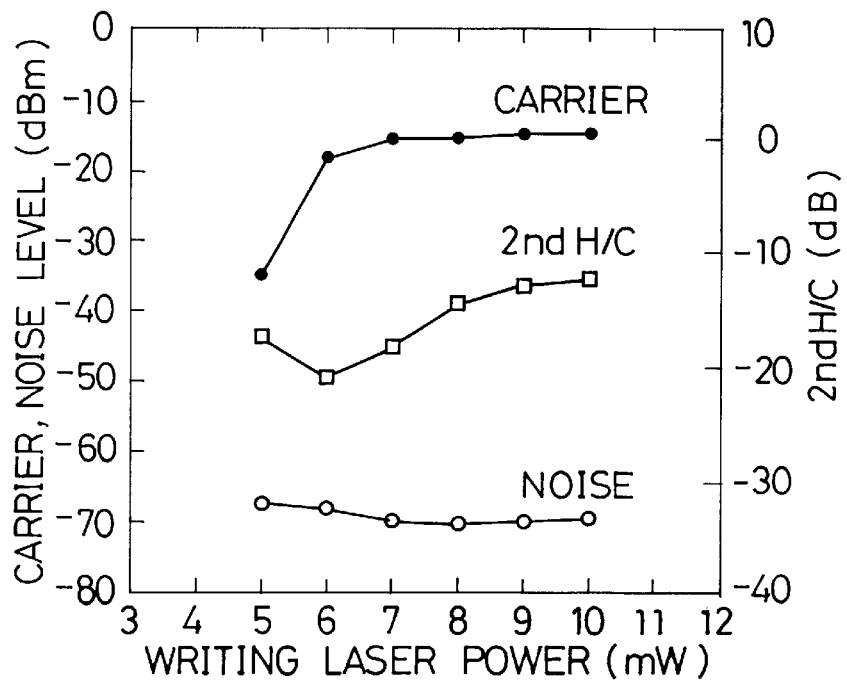
FIG. 21 is a graph showing relationship between recording laser power and carrier, noise and 2nd H/C levels in the third reference example.

FIG. 21 shows the dependency of carrier, noise and 2nd H/C levels on recording laser power, obtained when data was recorded into the optical disc medium in the following conditions:

Linear velocity; 6 m/s
Recording Frequency; 2 MHz
Duty Ratio; 50%
Reproduction Power; 1.0 mW
Erasion Power; 3.5 mW
Recording Power; 4.0–10.0 mW.

Figure 22:
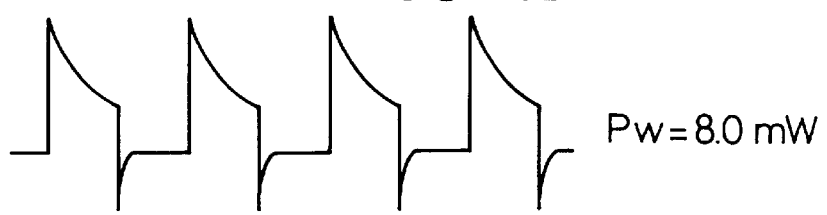
FIG. 22 is a schematic view illustrating RF signal waveforms obtained when data is being first recorded into the optical disc medium in accordance with the third reference example.
Figure 22:
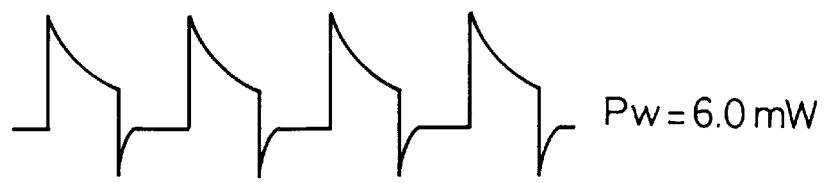
Figure 22:
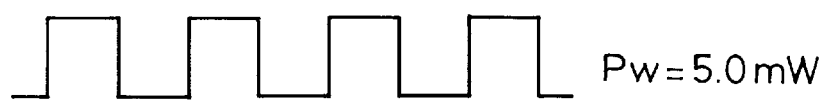
Figure 23:
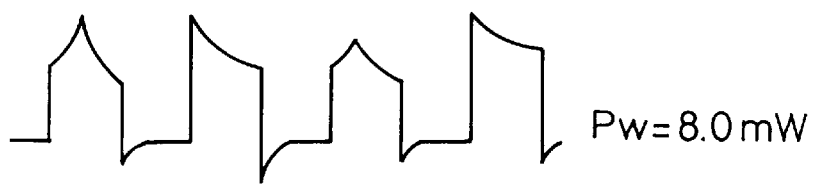
FIG. 23 is a schematic view illustrating RF signal waveforms obtained when data is being over-recorded into the optical disc medium in accordance with the third reference example.
Figure 23:
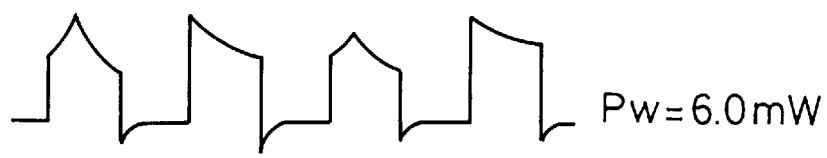
Figure 23:

FIG. 22 illustrates waveforms of RF signals obtained from the reflected laser beams while data is being first recorded into the optical disc medium, and FIG. 23 illustrates waveforms of RF signals obtained from the reflected laser beams while data is being over-recorded into the optical disc medium.

In this reference example, C/N ratios can be obtained for carrier, noise and 2nd H/C levels by designing the layers 92 to 95 to have a thickness so that a difference between the reflectivity Rc of a non-recorded or crystal region and the reflectivity Ra of a recorded or amorphous region is large.

It is found in FIG. 22 that the waveform of RF signals obtained when the recording laser power is greater than 6.0 mW is quite different from the waveform obtained when the recording laser power is smaller than 6.0 mW. Taking the waveforms illustrated in FIG. 22 into consideration together with FIGS. 3 and 21, it is considered that data is properly recorded into the optical disc medium when the recording laser beam power is equal to or greater than 6.0 mW. In the case that the recording laser power is greater than 6.0 mW, the recording layer 93 is molten immediately after radiation of the recording laser power, and thus the reflectivity is reduced with the result of reduction in the reflected laser beam in an amount. Even when the recording laser power is varied to the erasion power level, the waveform does not change into the unique shape like as if undershoot occurs, as found in the first to fourth embodiments, because the reflectivity Rm of the recording laser beam spot including the molten region is almost identical to the reflectivity Rc obtained when the recording layer 93 is in non-recorded condition.

On the other hand, in the case that the recording laser power is smaller than 6.0 mW, the reflected laser beam is not reduced in an amount, because the recording layer 93 is not molten, even if the recording laser power is increased up to the recording power level.

It is found in FIG. 23 illustrating waveforms of RF signals in over-recording that the recording layer 93 is not molten, even if the recording laser beam power is increased up to the recording power level, in the case that the recording laser power is smaller than 6.0 mW, and hence, the reflected laser beam is slightly changed in an amount in accordance with a difference prior to over-recording between the reflectivity Ra of the recorded region and the reflectivity Rc of the non-recorded region.

When the recording laser power is greater than 6.0 mW where data is properly recorded into the optical disc medium, the reflectivity is reduced due to the recording layer being molten, resulting in that the reflected laser beam is reduced in an amount. However, there can be seen significant fluctuation in the waveform immediately after the rise-up of recording pulses. The fluctuation is caused by a great difference prior to over-recording between the reflectivity Rc of a crystal region and the reflectivity Ra of an amorphous region. The fluctuation is of almost the same degree as the fluctuation in reflectivity caused by the melting of the recording layer.

When the recording laser beam power is varied to the erasion power level, the waveform may be changed into the unique shape as if undershoot occurs, because the reflectivity Rm of a recording laser beam spot including a molten region may become larger or smaller than the reflectivity Ra for a recorded region or the reflectivity Rc for a non-recorded region. However, there can be still found significant fluctuation. As a result, similarly to the earlier mentioned reference 2, it would be quite difficult or almost impossible to judge whether data is properly over-recorded into the optical disc medium, even if RF signals are monitored while data is being over-recorded into the medium.

TABLE 1

| | Rc [%] | Ra [%] | Rm [%] | Phase Difference between Crystal and Amorphous Regions [|φ|°] |
|---|---|---|---|---|
| Embodiment 3 | 22.5 | 22.8 | 16.5 | 48.0 |
| Reference 2 | 33.7 | 8.4 | 25.4 | 29.3 |
| Embodiment 4 | 23.3 | 24.6 | 18.3 | 65.2 |
| Reference 3 | 32.6 | 0.4 | 21.4 | 6.4 |

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application Nos. 8-252949 and 8-254620 filed on Sep. 13, 1997 and Sep. 26, 1997, respectively, including specification, claims, drawings and summary is incorporated herein by reference in its entirety.

What is claimed is:

1. A phase-change type optical recording medium, comprising:

(a) a substrate;

(b) a recording layer formed on said substrate wherein a, phase condition of said recording layer being changed when a laser beam is radiated thereonto, to thereby record, erase or reproduce data into or from said recording layer; and (c) a reflection layer formed on said recording layer for reflecting a laser beam having been radiated onto said recording layer, said recording layer being formed so that the following equation (B) is satisfied:

$$Rc-Ra| \leq 5\%$$

$$Rc>Rm, Ra>Rm \quad (B)$$

wherein Rc indicates a reflectivity to be obtained when said recording layer is in crystal condition, Ra indicates a reflectivity to be obtained when said recording layer is in amorphous condition, and Rm indicates a reflectivity to be obtained when said recording layer is in mixed condition of molten condition and crystal or amorphous condition.

2. The phase-change type optical recording medium as set forth in claim 1, wherein said substrate and recording layer are designed to have a thickness so that said equation (B) is satisfied.

3. The phase-change type optical recording medium as set forth in claim 1, wherein said substrate and recording layer are made of particular material so that said equation (B) is satisfied.

4. The phase-change type optical recording medium as set forth in claim 1, further comprising a lower protection layer formed between said substrate and said recording layer, and an upper protection layer formed between said recording layer and said reflection layer.

5. The phase-change type optical recording medium as set forth in claim 3, wherein said substrate, recording layer, lower protection layer and upper protection layer are designed to have a thickness so that said equation (B) is satisfied.

6. The phase-change type optical recording medium as set forth in claim 4, wherein said substrate, recording layer, lower protection layer and upper protection layer are made of particular material so that said equation (B) is satisfied.

7. The phase-change type optical recording medium as set forth in claim 1, wherein laser beam is radiated through said substrate.

8. The phase-change type optical recording medium as set forth in claim 1, wherein said reflecting layer is made of metal.

9. The phase-change type optical recording medium as set forth in claim 8, wherein said reflecting layer is made of aluminum.

10. The phase-change type optical recording medium as set forth in claim 1, wherein said recording layer is made of at least germanium (Ge), antimony (Sb) or tellurium (Te).

11. The phase-change type optical recording medium as set forth in claim 4, wherein said lower and upper protection layers include $ZnSSiO_2$.

12. The phase-change type optical recording medium as set forth in claim 1, wherein a phase difference φ between crystal region and amorphous region both formed in said recording layer at a laser wavelength used for recording data meet the following equation (C):

$$30° \leq |\phi| \leq 180°  \quad (C)$$

13. The phase-change type optical recording medium as set forth in claim 12, wherein said recording layer and reflection layer are designed to have a thickness such that said equation (C) is established.

14. The phase-change type optical recording medium as set forth in claim 1, further comprising a UV resin protection layer formed on said reflection layer.

15. A method of optically recording data, comprising the steps of:

(a) preparing a phase-change type optical recording medium, said phase-change type optical recording medium comprising: a substrate; a recording layer formed on said substrate wherein a, phase condition of said recording layer being changed when a laser beam is radiated thereonto, to thereby record, erase or reproduce data into or from said recording layer; and a reflection layer formed on said recording layer for reflecting a laser beam having been radiated onto said recording layer, said recording layer being formed so that the following equation (B) is satisfied:

$$|Rc-Ra| \leq 5\%$$

$$Rc>Rm, Ra>Rm \quad (B)$$

wherein Rc indicates a reflectivity to be obtained when said recording layer is in crystal condition, Ra indicates a reflectivity to be obtained when said recording layer is in amorphous condition, and Rm indicates a reflectivity to be obtained when said recording layer is in mixed condition of molten condition and crystal or amorphous condition;

(b) radiating laser beam onto said recording layer;

(c) monitoring laser beam reflected from said recording layer; and (d) judging whether data is properly recorded, based on how the reflected laser beam varies in an amount.

16. The method as set forth in claim 15, wherein said substrate and recording layer are designed to have a thickness so that said equation (B) is satisfied.

17. The method as set forth in claim 15, wherein said substrate and recording layer are made of particular material so that said equation (B) is established.

18. The method as set forth in claim 15, wherein said laser beam is radiated in pulse.

19. The method as set forth in claim 15, wherein said phase-change type optical recording medium further comprises a lower protection layer formed between said substrate and said recording layer, and an upper protection layer formed between said recording layer and said reflection layer.

20. The method as set forth in claim 19, wherein said substrate, recording lawyer, lower protection layer and upper protection layer are designed to have a thickness so that said equation (B) is satisfied.

21. The method as set forth in claim 19, wherein said substrate, recording layer, lower protection layer and upper protection layer are made of particular material so that said equation (B) is satisfied.

\* \* \* \* \*

UNITED STATES PATENT AND TRADEMARK OFFICE
CERTIFICATE OF CORRECTION

PATENT NO.   : 6,252,844 B1
DATED        : June 26, 2001
INVENTOR(S)  : Masayuki Kubogata It is certified that error appears in the above-identified patent and that said Letters Patent is hereby corrected as shown below:

Column 18,
Line 16, insert -- "/" -- before "Rc"

Signed and Sealed this

Fourth Day of June, 2002

Attest:

Attesting Officer

JAMES E. ROGAN
Director of the United States Patent and Trademark Office